United States Patent
Frizzell, III (10) Patent No.: US 11,052,808 B2
(45) Date of Patent: Jul. 6, 2021

(54) EXPANDABLE BUGGY FOR VEHICLE

(71) Applicant: Benjamin Milton Frizzell, III, Ooltewah, TN (US)

(72) Inventor: Benjamin Milton Frizzell, III, Ooltewah, TN (US)

(\*) Notice: Subject to any disclaimer, the term of this patent is extended or adjusted under 35 U.S.C. 154(b) by 0 days.

(21) Appl. No.: 16/830,126

(22) Filed: Mar. 25, 2020

(65) Prior Publication Data

US 2020/0406807 A1   Dec. 31, 2020

Related U.S. Application Data

(60) Provisional application No. 62/866,186, filed on Jun. 25, 2019.

(51) Int. Cl.
*B60P 1/52*   (2006.01)

(52) U.S. Cl.
CPC ..................... *B60P 1/52* (2013.01)

(58) Field of Classification Search
CPC ... B60P 1/52; B62D 33/02; B62B 3/02; B62B 2206/02; B62B 2206/04; B65B 5/0093
See application file for complete search history.

(56) References Cited

U.S. PATENT DOCUMENTS

| | | | | |
|---|---|---|---|---|
| 5,816,604 A * | 10/1998 | Hsieh | ................ | B62B 3/02 280/655.1 |
| 5,934,725 A * | 8/1999 | Bowers | ................ | B60P 3/40 296/26.09 |
| 5,988,722 A * | 11/1999 | Parri | ................ | B60P 1/003 224/403 |
| 6,065,792 A * | 5/2000 | Sciullo | ................ | B60P 1/003 296/26.09 |
| 6,705,656 B2 * | 3/2004 | Keller | ................ | B60P 1/003 224/402 |
| 7,090,275 B2 * | 8/2006 | Pero | ................ | B60P 1/003 296/26.09 |
| 7,237,817 B2 * | 7/2007 | Kobylski | ................ | B60P 1/003 296/26.01 |
| 7,445,263 B1 * | 11/2008 | Bluhm | ................ | B60P 1/003 296/26.09 |
| 8,944,442 B2 * | 2/2015 | Tsai | ................ | B62B 3/02 280/35 |
| 9,545,865 B2 * | 1/2017 | Lindgren | ................ | B60P 1/003 |
| 9,694,838 B2 * | 7/2017 | Gullino | ................ | B62D 7/026 |

(Continued)

*Primary Examiner* — Kaitlin S Joerger (74) *Attorney, Agent, or Firm* — Knox Patents; Thomas A. Kulaga (57) ABSTRACT

Apparatus and method for handling and securing cargo in a vehicle bed. The apparatus is a buggy with an adjustable width platform and an adjustable length handle that is both a locking device and a lifting device. The platform has a pair of frame rails with multiple adjustable length crossmembers spaced therebetween. The platform has wheels that allow the buggy to be moved between a loading position and a transport position. The handle is used to move the platform between the two positions. The handle has an adjustable length to secure the buggy in the transport position. In another embodiment, a tailgate hook with a catch that holds the platform captive in the vehicle. A shield is releasably positioned over a portion of at least two crossmembers of the platform. The shield has a surface that supports small and/or odd shaped cargo to prevent such cargo from falling between crossmembers.

19 Claims, 6 Drawing Sheets

(56) References Cited

U.S. PATENT DOCUMENTS

| | | | |
|---|---|---|---|
| 9,789,800 B2* | 10/2017 | Thygesen | B62D 33/08 |
| 10,543,862 B1* | 1/2020 | Aguirre | B62B 3/02 |
| 2002/0180231 A1* | 12/2002 | Fox | B62D 33/0273 |
| | | | 296/26.01 |
| 2006/0033377 A1* | 2/2006 | Frimel | B60P 1/003 |
| | | | 298/1 A |

* cited by examiner

EXPANDABLE BUGGY FOR VEHICLE

CROSS-REFERENCE TO RELATED APPLICATIONS

This application claims the benefit of U.S. Provisional Application No. 62/866,186, filed Jun. 25, 2019.

STATEMENT REGARDING FEDERALLY SPONSORED RESEARCH OR DEVELOPMENT

Not Applicable

BACKGROUND

1. Field of Invention

This invention pertains to a buggy configured to fit inside a vehicle. More particularly, this invention pertains to a buggy that is an expandable width cart with an extendable handle that locks in place during transport in a carrier vehicle.

2. Description of the Related Art

Certain vehicles, such as pickup trucks and some trailers, have a bed configured to transport cargo or freight. Cargo loaded in the bed is often difficult to access. If the vehicle bed has cover, such as a hard shell or tarp or tonneau cover, handling of cargo to be loaded or removed from the vehicle bed becomes even more difficult, particularly if the cargo is heavy or has an odd shape that is not conducive to easy handling.

It is also common for vehicle beds to have ridges on the bottom surface. The ridges typically provide structural strength to the vehicle bed. The ridges also serve to raise the cargo slightly, but the valleys between ridges can fill with water and/or debris if the vehicle bed is exposed to the environment. Cargo stored and/or transported in a vehicle bed is subject to damage from such water and debris in the bed.

The conventional solution for handling cargo is to use a pallet to support the cargo above a surface. In this way, the cargo is supported above the surface, thereby protecting the cargo from surface contaminates such as water and debris. The bottom surface of the pallet rests against the vehicle bed. The pallet must be lifted above the bed or resting surface in order to move the pallet and its cargo. Pallets typically have a pair of opposing surfaces with a space for forks, such as found on a forklift or pallet jack. Pallets allow cargo to be readily moved through the use of forklifts and pallet jacks.

BRIEF SUMMARY

According to one embodiment of the present invention, an expandable buggy configured to fit inside a vehicle is provided. The buggy is a mobile device or vehicle that carries cargo within another, larger vehicle. The buggy is carried in the vehicle's bed and is movable between a loading position and a transport position. The loading position is where the buggy is positioned for ready access for loading and unloading cargo. The transport position is where the buggy is secured in the vehicle bed such that motion of the buggy relative to the vehicle bed is minimized or prevented while the vehicle is in motion.

The buggy includes a platform with wheels and a locking device. The platform has a frame with a pair of frame rails with crossmembers therebetween. The crossmembers are adjustable in length, thereby allowing the width of the platform to be adjusted. In one embodiment, the crossmembers are two telescoping members that slideably engage. In one such embodiment, the telescoping members include holes that allow the two telescoping members to be fixed together with a desired length. In another such embodiment, at least one crossmember includes a detent that fixes the telescoping members at a desired length.

The frame rails include openings into which the ends of the crossmembers fit. In one embodiment, the ends of the crossmembers are secured to the frame rails with an adhesive. In another embodiment, the ends of the crossmembers are secured to the frame rails with removable fasteners. In this way the crossmembers are separable from the frame rails to allow for compact shipping and storage of the disassembled platform.

In one embodiment, the platform includes bumpers at the ends of the frame rails. The bumpers are resilient and cushion the platform when the platform is pushed against the inside of the vehicle bed.

A set of wheels extend from the bottom of the frame rails. A sufficient number of wheels are used to support the weight of the cargo to be carried on the platform. In one embodiment, four wheels are positioned near the corners of the platform. In another embodiment, six wheels are used with three wheels spaced along each frame rail. In one embodiment, the wheels rotate such that the frame rails move along the rail's longitudinal axis. The width of the platform is adjusted so that the wheels ride in the space between ridges formed in the bottom of the vehicle's bed. In one embodiment, the wheels include casters that allow the wheels to pivot as the platform is positioned in the vehicle bed. In yet another embodiment, the wheels are oriented such that the platform moves perpendicular to the longitudinal axis of the frame rails. With such a wheel configuration, the platform can be positioned crossways in the vehicle bed.

In one embodiment, one or more of the wheels are lockable such that the platform is secured in place by locking the wheels. In another embodiment, the wheels are recessed in the frame rails with only a small portion extending from the bottom of the frame rails. The wheels protrude sufficiently for the bottom of the frame rails to clear the ridges in the bed floor. With recessed wheels, the platform is lower to the vehicle's bed floor to allow greater clearance between the platform and any cover over the bed. In another embodiment, the wheels are part of a wheel assembly that fit into cavities in the frame rails. In one such embodiment, the wheel assemblies fit into the cavity with either the wheels aligned with the longitudinal axis of the frame rails or perpendicular to the longitudinal axis. In one such embodiment, the cavity is elongated to allow the wheel assembly to be positioned so as to best fit in the vehicle bed.

The locking device in one embodiment is a handle attached to the platform. The handle has a distal end that extends past the edge of the platform in a direction parallel to the longitudinal axis of the frame rails. The handle has a proximal end attached to the platform with the shaft of the handle under the crossmembers. The handle has a limited range of vertical movement. In the upward direction, the handle is restricted by the crossmembers such that attempts to lift the handle such that the hand grip is above a horizontal plane causes the handle to lift one end of the platform. In various embodiments, the handle is movable in the downward direction until the handle encounters the ground or other object under the buggy.

The handle allows the platform to be moved back and forth on the wheels by a user pushing and pulling on the handle. The handle is a telescoping pole where the length of the handle is adjustable and is lockable or fixable at a desired length. When the buggy is in the transport position the length of the handle is adjusted so that the buggy fits within the confines of the vehicle bed with little or no room from the buggy to move along the length of the vehicle bed.

The handle is attached to the platform with one of several embodiments of fittings. In one embodiment, the fitting attaching the proximal end of the handle to a crossmember includes a U-bolt extending above the shaft of the handle and engaging the crossmember. In one embodiment, the U-bolt has a loose engagement with the crossmember, thereby allowing the fitting to move along the longitudinal axis of the crossmember so that the handle is positionable for convenient access. In another embodiment, the proximal end of the handle's shaft has an eye-bolt extending therefrom. The eye or opening in the eye-bolt engages the crossmember to support the end of the handle. The eye-bolt has a bent shaft that positions the eye or opening in the e-bolt above the longitudinal axis of the handle such that the handle shaft is under the crossmembers and parallel to the plane of the crossmembers. In yet another embodiment of the fitting, a sleeve fits over a crossmember and a pivot engages the sleeve, the crossmember, and the proximal end of the handle shaft. In this way the handle pivots or rotates about the pivot. Such an embodiment is useful for the embodiments where the wheels are casters or where the wheels are oriented perpendicular to the longitudinal axis of the frame rails.

Another embodiment of the buggy provides for a shield that sits across two or more of the crossmembers. The shield has a surface that bridges the gap between crossmembers, thereby allowing small or odd-shaped cargo to be carried without falling in the gap between adjacent crossmembers. The shield is sized and configured such that two or more shields are positionable side-by-side on the same crossmembers. In this way the shields are able to fit on the platform when the platform is adjusted to various widths.

The locking device in another embodiment is a tailgate hook that extends from the end of a frame rail. In one such embodiment, a pair of tailgate hooks extend from the platform. The tailgate hook rotates such that a catch is positionable in the gap between the bed floor and the tailgate. In this way the buggy is held in a fixed position by the hook. In one embodiment, the tailgate hooks provide the sole means for holding the buggy in the transport position. In another embodiment, the tailgate hooks are used in conjunction with the handle.

A method of using the buggy includes the steps of placing the buggy in the vehicle, adjusting the width of the platform, positioning the platform near the open tailgate of the vehicle bed, loading cargo on the platform, pushing the platform into the vehicle bed, adjusting the length of the handle such that the platform and handle fit between the front end of the bed and the inside of the tailgate. To unload the cargo, the steps are reversed.

BRIEF DESCRIPTION OF THE SEVERAL VIEWS OF THE DRAWINGS

The above-mentioned features will become more clearly understood from the following detailed description read together with the drawings in which.

DETAILED DESCRIPTION

Apparatus for an expandable buggy for vehicle is disclosed. The buggy is generally indicated as 100, with particular embodiments and variations shown in the figures and described below having an alphabetic suffix, for example, 100-A, 100-B. Furthermore, different positions of the buggy 100 are identified with a numeric suffix, for example, 100-1, 100-2 for the loading/unloading position and the transport position, respectively.

Various components are illustrated both generically and specifically in the figures and in the following description. For example, the handle 106-A, 106-B is discussed individually and separately to ensure clarity when describing the configuration of each handle 106-A, 106-B. The handle 106, when referred to collectively, is referenced without an alphanumeric suffix. Furthermore, directional and/or orientation references, such as horizontal, vertical, top, and bottom, are referenced to the buggy 100 in a deployed position with the wheels 402 on a surface such as the floor 124.

Figure 1:
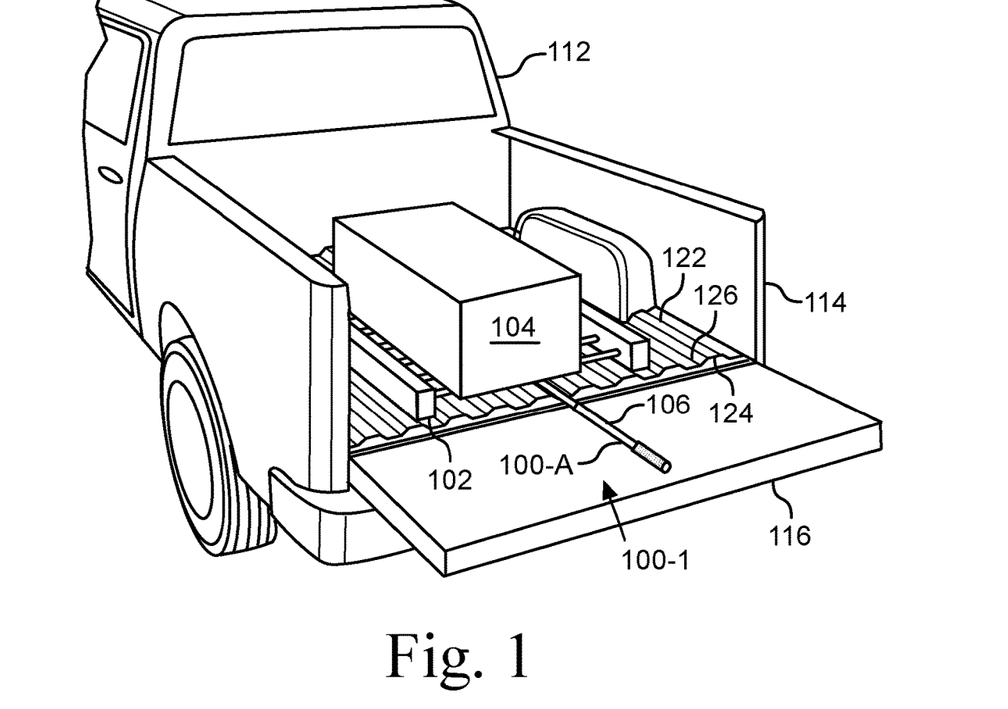
FIG. 1 is a perspective view of a vehicle with a buggy in a loading position.

FIG. 1 illustrates a perspective view of a vehicle 112 with a buggy 100-A shown in a loading position 100-1. The buggy 100-A includes a platform 102 and a locking device, which is a handle 106 in the illustrated embodiment. The buggy 100-A is illustrated in a vehicle 112. FIG. 1 shows the vehicle 112 as a pickup truck with a bed 114 having a tailgate 116 in the lowered, or open, position. A person of ordinary skill in the art would recognize that the vehicle 112 can be a trailer or other mobile device without departing from the spirit and scope of the invention. The vehicle bed 114 has a floor 124 that includes a series of ridges 122 separated by valleys or depressions 126. The ridges 122 are raised surfaces that extend longitudinally along the length of the bed 116.

The illustrated embodiment of the buggy 100-A includes a platform 102 and a handle 106. The platform 102 supports cargo 104, which is represented by the box in FIG. 1. The handle 106 extends from the platform 102 out of the bed 114 and over the tailgate 116, which is in the open or lowered position. In this way, the handle 106 allows the platform 102 to be pulled out of the bed and pushed back in. With the buggy 100-A in the loading position 100-1, the cargo 104 is readily loaded and removed from the platform 102. To gain access to the cargo 104, the tailgate 116 is lowered and the handle 106 is pulled to move the platform 102 into a position where the cargo 104 is accessible for loading and/or removal.

Figure 2:
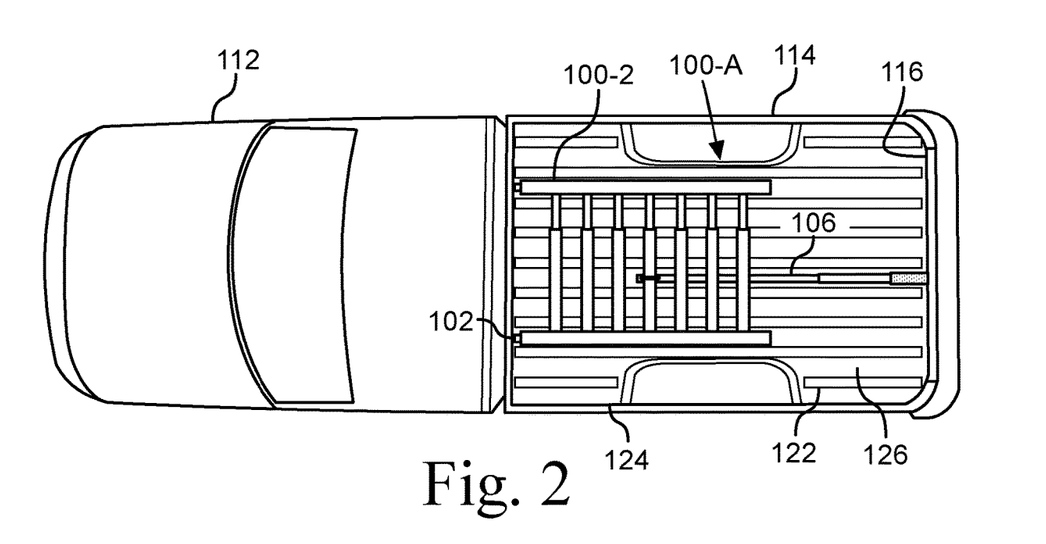
FIG. 2 is a top plan view of the vehicle with the buggy in a transport position.

FIG. 2 illustrates a top plan view of the vehicle 112 with the buggy 100-A in a transport position 100-2. The buggy 100-A is shown extending the full length of the bed 114. In this way, the buggy 100 is restrained between the inside ends of the bed 114, and inhibited from moving inside the bed 114 relative to the vehicle 112 when the vehicle 112 is in motion. Also, the side frame rails 302, which have wheels 402 extending from the bottom 404, are aligned with the valleys 126.

From the loading position 100-1 illustrated in FIG. 1, the handle 106 is used to push the platform 102 into the vehicle bed 114 and the tailgate 116 is closed, thereby capturing the buggy 100-A inside the vehicle bed 114. The handle 106 has an adjustable length so that the overall length of the buggy 100-A fits within the confines of the vehicle bed 114 such that front-to-back movement of the buggy 100-2 is minimized or prevented.

Figure 3:
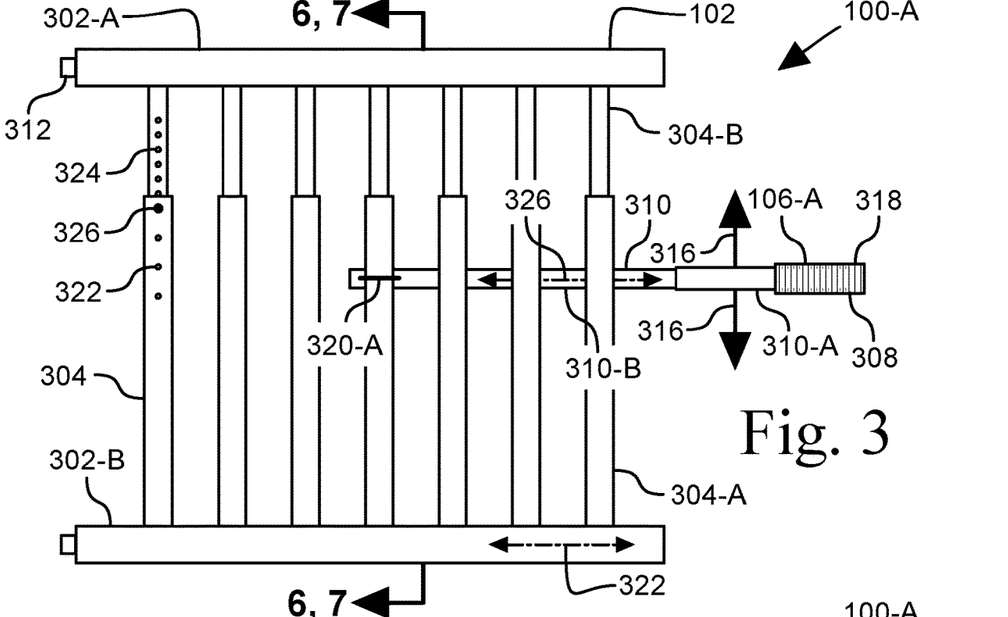
FIG. 3 is a top plan view of a first embodiment of a buggy.

FIG. 3 illustrates a top plan view of a first embodiment of a buggy 100-A. The illustrated buggy 100-A includes a platform 102 and one embodiment of a handle 106-A, which is a locking device. The platform 102 includes a pair of frame rails 302-A, 302-B. Multiple crossmembers 304 extend between the pair of frame rails 302-A, 302-B. Each of the frame rails 302-A, 302-B have a longitudinal axis 322 that extends along the length of the rails 302-A, 302-B between their distal ends. The crossmembers 304 have an outer member 304-A and an inner member 304-B. The inner and outer members 304-A, 304-B telescope such that the separation between the pair of frame rails 302-A, 302-B varies.

In the illustrated embodiment, the platform 102 includes seven crossmembers 304 spaced along the pair of frame rails 302-A, 302-B. A person of ordinary skill will recognize that the number of crossmembers 304 can vary without departing from the spirit and scope of the invention. In one embodiment, the ends of the crossmembers 304 engage holes in the frame rails 302-A, 302-B and the crossmembers 304 whereby the crossmembers 304 are securely fastened, such as by an adhesive or fasteners.

In one embodiment, the crossmembers 304 are adjustable between 25 and 50 inches by the inner member 304-B sliding inside the outer member 304-A. A person of ordinary skill will recognize that the amount of adjustment of the crossmembers 304 can vary without departing from the spirit and scope of the invention.

In the illustrated embodiment, one crossmember 304 includes multiple, spaced holes that allow the inner and outer members 304-A, 304-B to be locked together. The outer member 304-A has a series of spaced holes 322 and the inner member 304-B has a series of spaced holes 324. A pin 326 engages one hole 322 in the outer member 304-A and one hole 324 in the inner member 304-B when the pair of frame rails 302-A, 302-B have a desired distance separating them. In this way, the width of the platform 102 is adjustable as desired. In one embodiment, the pin 326 is a fastener, such as a bolt with nut. In other embodiments, the pin 326 is a clevis, lynch, hitch, or locking pin configured to engage the holes 322, 324 and be secured in place. In another embodiment, the pin 326 is a detent, for example, a spring-loaded button, that engages a hole 322 in the outer member 304-A.

In the illustrated embodiment, a pair of bumpers 312 extend from the ends of the pair of frame rails 302 opposite where the handle 106-A extends from the platform 102. In one embodiment, the bumpers 312 are resilient, such as a rubber-like material. One function of the bumpers 312 is to bias the buggy 100 away from the front end 516 when the buggy 100 is wedged in the bed 114 between the front end 516 and the closed tailgate 116. Another function of the bumpers 312 is to protect the inside surface of the bed 114 from the buggy 100, such as when the vehicle 112 is in motion.

FIG. 3 illustrates one embodiment of a locking device, namely a handle 106-A attached to and extending beyond the platform 102. The illustrated embodiment of the handle 106-A has a shaft 310 that extends from one crossmember 304 to a hand grip 308 at the distal end 318 of the handle 106-A. The shaft 310 of the handle 106-A is attached to the crossmember 304 with a fitting 320-A that allows the handle 106-A to move in a direction 316 that is parallel with a longitudinal axis of the crossmember 304.

The handle 106-A has a longitudinal axis 326 that is parallel to the longitudinal axis 322 of the frame rails 302. Furthermore, the handle 106-A is attached to the platform 102 in such a manner that the handle 106-A is restrained from moving upward by crossmembers 304. That is, the shaft 310 engages the bottom of the crossmembers 304 when the hand grip 308 (or distal end 318) is moved upwards. Continued upward movement of the hand grip 308 (or distal end 318) causes the front of the platform 102 to lift with the platform 104 pivoting on the wheels 402 nearest the bumpers 312.

The shaft 310 of the handle 106 is adjustable in length. In one embodiment, the shaft 310 of the handle 106 includes two portions 310-A, 310-B. The two portions 310-A, 310-B of the shaft 310 telescope such that the length of the handle is adjustable as desired. In one such embodiment, the two portions 310-A, 310-B of the shaft 310 operate with a twisting action. That is, twisting the two portions 310-A, 310-B relative to each other in one direction allows the length to be adjusted and twisting in the other direction locks shaft 310 at the selected length. In another embodiment, the two portions 310-A, 310-B of the shaft 310 are connected with a locking collar that allows adjusting the shaft length with the locking collar fixing the shaft 310 at a desired length. In other embodiments, the shaft 310 of the handle 106 includes other mechanisms that allow for an adjustable length. For example, in one embodiment, the shaft 310 includes a spring that biases the handle 106 to a maximum length. In such an embodiment, the handle 106 is compressed to fit the buggy 100 in the bed 114 and, with the handle 106 released, the distal end 318 of the handle 106 pushes against the tailgate 116, thereby wedging the buggy 100 in the bed 114.

Figure 4:
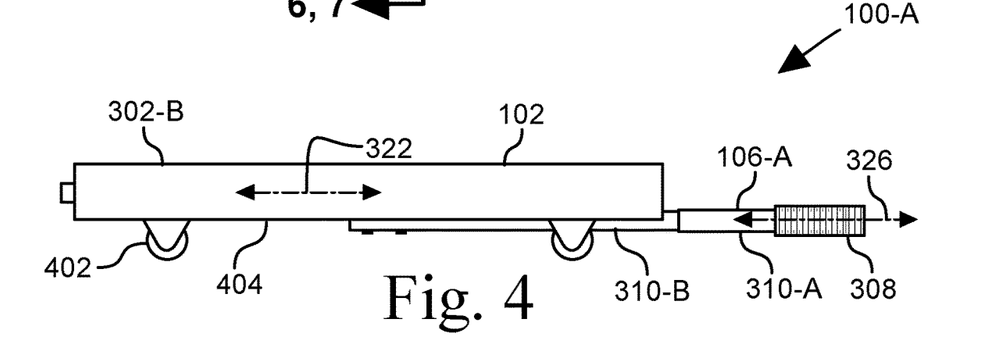
FIG. 4 is a side view of the buggy shown in FIG. 3.

FIG. 4 illustrates a side view of the buggy 100-A shown in FIG. 3. The handle 106-A extends beyond the platform 102. The handle 106-A is shown in a horizontal position, that is, where the longitudinal axis 326 of the handle 106-A is parallel to the longitudinal axis 322 of the frame rails 302.

The handle 106-A has limited vertical movement. For example, the proximal end of the handle 106-A has a fitting 320-A that is attached to a crossmember 304. The handle 106-A pivots or rotates about that fitting 320-A. Upward movement of the handle 106-A is restricted by the other crossmembers 304 between the fitting 320-A and the hand grip 308. The hand grip 308 is inhibited from moving above the plane defined by those crossmembers 304. Movement of the hand grip 308 upwards above the horizontal plane will lift the proximal or near end of the platform 102 with the platform 102 pivoting on the far wheels 402. The far wheels 402 are those wheels 402 nearest or proximal to the bumpers 312. In other words, the handle 106 is a lifting device that is part of a lever that lifts or tilts the platform 102. In the embodiments where the fitting 320 loosely engages the engaging crossmember 302, the handle 106 is able to pivot downward in the vertical direction until the handle 106 engages or rests on a surface or object under the handle 106.

Wheels 402 extend from the bottom 404 of the frame rails 302 of the platform 102. In the illustrated embodiment, the wheels 402 are positioned below the frame rails 302. In one embodiment, each wheel 402 is configured to rotate such that the platform 102 moves in a direction parallel to the longitudinal axis 322 of the frame rails 302-A, 302-B. In another embodiment, two or more of the four wheels 402 are casters, which are wheels that are free to swivel along an axis perpendicular to the axis of rotation of the wheel. In yet another embodiment, each frame rail 302 has three or more wheels 402 spaced along its length. In this way, the weight of the cargo 104 carried on the platform 102 is distributed among the multiple wheels 402, thereby decreasing the loading of any one wheel 402.

Figure 5:
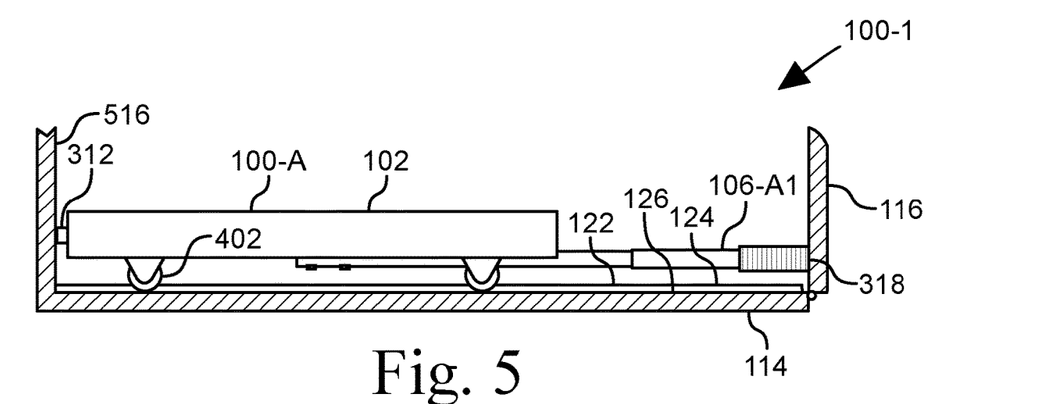
FIG. 5 is a side view of one embodiment of the buggy in the transport position.

FIG. 5 illustrates a side view of one embodiment of the buggy 100-A in the transport position 100-1. The vehicle bed 114 extends from the front end 516 to the tailgate 116 at the back end. The bed 114 has a floor 124 that includes a series of ridges 122 separated by valleys or depressions 126. The ridges 122 extend between the front end 516 and the tailgate 116 of the bed 114. The wheels 402 rest on the floor 124 of the bed 114 in the space 126 between the ridges 122.

The buggy 100, when in the transport position 100-1, is secured in the vehicle bed 114 such that movement of the buggy 100 is minimized. That is, when the vehicle 112 moves, the motion of the buggy 100 relative to the vehicle 112, and the bed 114, is minimized. In the illustrated embodiment, the buggy 100 is wedged in the bed 114. In another embodiment, the buggy 100 is loosely restrained in the bed 114 with a gap between the buggy 100 and the front wall 516 and/or the closed tailgate 116.

The platform 102 has bumpers 312 that engage the front wall 516 of the vehicle bed 114. Extending from the opposite end of the platform 102 is the handle 106. In this way, the buggy 100 is secured in the transport position 100-1 by the bumpers 312 and the handle 106-A1.

FIG. 5 shows the distal end 318 of the handle 106-A1 proximate the inside wall of the tailgate 116. The handle 106 has an adjustable length with the length of the handle 106-A1 in the transport position 100-1 being such that the distance between the distal ends of the bumpers 312 and the distal end 318 of the handle 106-A1 is about the same as the distance between the front end 516 and the tailgate 116 of the vehicle bed 116. In one embodiment, the handle 106 includes a biasing mechanism, such as a spring, that biases the distal end 318 of the handle 106-A1 against the tailgate 116, thereby wedging the buggy 100 between the front end 516 and the tailgate 116 of the vehicle bed 116. In another embodiment, the handle 106-A1 forms a solid member of fixed length, where the length is sufficient to inhibit the buggy 100 from moving a substantial distance between the front end 516 and the tailgate 116 of the vehicle bed 116.

Figure 6:
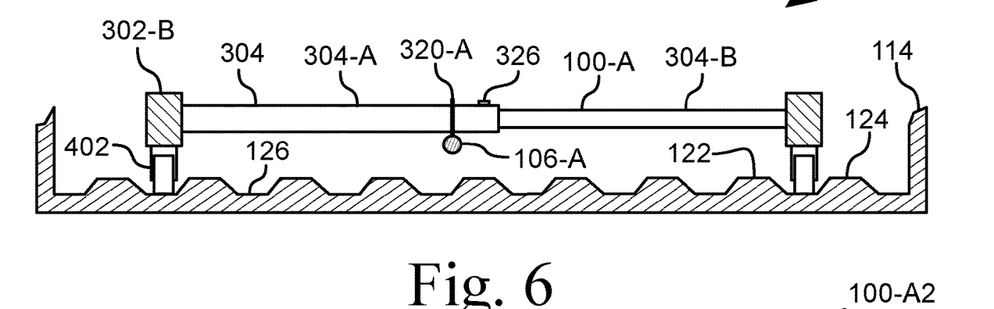
FIG. 6 is a cross-sectional view of an embodiment of the buggy shown in an extended, wide configuration.
Figure 7:
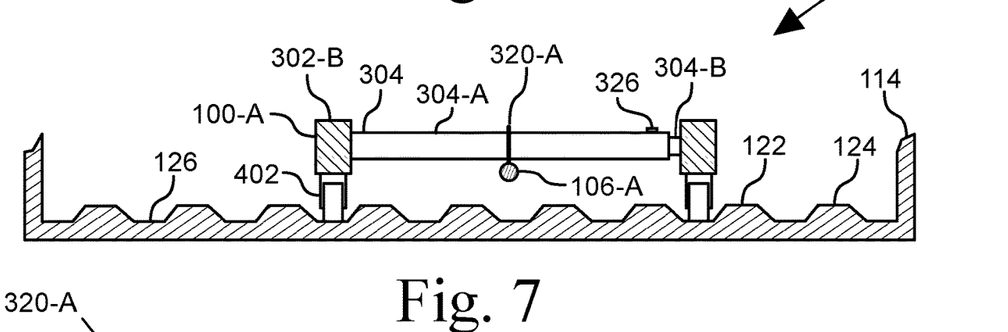
FIG. 7 is a cross-sectional view of an embodiment of the buggy shown in a narrow configuration.

FIG. 6 illustrates a cross-sectional view of an embodiment of the buggy 100-A shown in an extended, wide configuration 100-A1. FIG. 7 illustrates a cross-sectional view of an embodiment of the buggy 100-A shown in a narrow configuration 100-A2. The adjustable width of the platform 102 allows the platform 102 to better fit the dimensions of the vehicle bed 114 and to also accommodate different sized cargo 104.

The wheels 402 extending from the bottom 404 of the frame rails 302-A, 302-B are shown aligned with the valleys 126. Consequently, the ridges 122 are positioned to the sides of the wheels 402. When the wheels 402 move toward the ridges 122, they edges or sides of the ridges 122 force the wheels 402 into the valley 126 between the ridges 122. In this way, the wheels 402 are constrained to move within the valleys 126, which keeps the platform 102 aligned longitudinally in the bed 114 of the vehicle 112.

The width of the platform 102 is adjustable by way of the outer member 304-A and the inner member 304-B telescoping to a desired width where the wheels 402 ride in the valley 126 between the ridges 122 of the bed floor 124. In one embodiment, the two members 304-A, 304-B of the crossmember 304 are locked together at a desired width. In one such embodiment, a pin or detent 326 locks the two members 304-A, 304-B at the desired width. In another embodiment, the two members 304-A, 304-B frictionally engage and are held in relative alignment by the wheels 402 being constrained by the ridges 122, which tend to keep the wheels 402 traveling in the valley or space 126 between the ridges 122.

The tops of the crossmembers 304 of the platform 102 elevates the cargo 104 above the floor 124 of the bed 114 a distance sufficient to prevent the cargo 104 from sitting on any water or small debris in the bed 114. The distance the cargo 104 is above the floor 124 of the bed 114 is defined by the thickness of the crossmembers 304, the thickness of the handle 106, the distance from the bottom of the crossmembers 304 to the bottom 404 of the frame rails 302, and the distance that the wheels 402 extend below the bottom 404 of the frame rails 302. It is advantageous to minimize the distance between the cargo 104 and the floor 124 of the bed 114 in order to maximize the height above the crossmembers 304 to any cover or closure over the bed 114. In one embodiment, the distance between the cargo 104 and the floor 124 is minimized by recessing the wheels 402 in the frame rails 302. See, for example, FIG. 16. In another such embodiment, the wheels 402 are attached to the sides of the frame rails 302, not the bottom 404.

Figure 8:
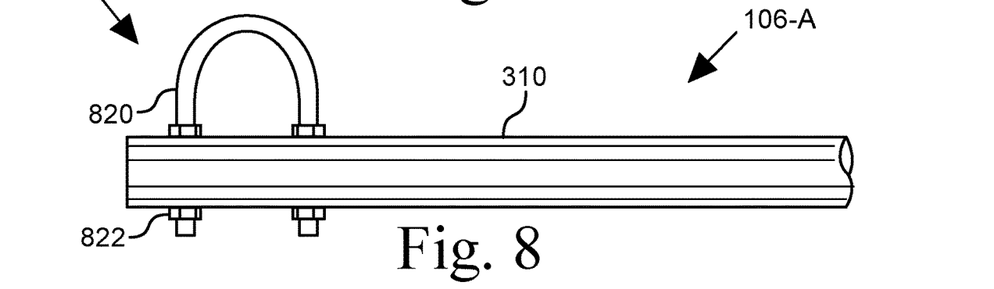
FIG. 8 is a partial side view of a first embodiment of a handle.

FIG. 8 illustrates a partial side view of a first embodiment of a handle 106-A. The handle 106-A has a fitting 320-A that includes a U-bolt 820 fastened to the end of the shaft 310 with nuts 822. In one embodiment, a crossmember 304 fits loosely inside the U-bolt 820. The loose fit allows the handle 106-A to move laterally 316 along the crossmember 304. In another embodiment, the U-bolt 820 fits snugly to the crossmember 304, thereby securing the end of the shaft 310 to the crossmember 304. In this embodiment, the handle 106-A is positioned where desired and the U-bolt 820 is then secured to the shaft 310 such that the handle 106-A is fixed to the crossmember 304.

Figure 9:
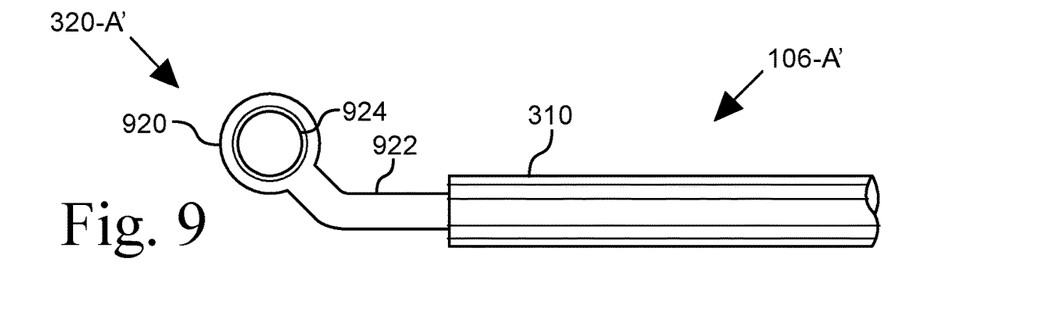
FIG. 9 is a partial side view of a second embodiment of a handle.

FIG. 9 illustrates a partial side view of a second embodiment of a handle 106-A'. The handle 106-A' has a fitting 320-A' that includes an eye-bolt 920 with a fitting shaft 922 that engages the end of the handle shaft 310. The eye-bolt 920 includes an opening 924 that is sized to receive a crossmember 304. The fitting shaft 922 is bent such that the eye-bolt 920 has an opening 924 that is offset from the longitudinal axis of the handle shaft 310. In this way, the handle 106-A' is positionable under the crossmembers 304 with the longitudinal axis of the handle 106-A' parallel with the plane of the crossmembers 304.

In one embodiment, the handle 106-A' is attached to the platform 102 by separating the outer members 304-A from the inner members 304-B and then sliding one of the members 304 into the opening 924 in the eye-bolt 920. The opening 924 in the fitting 320-A' is dimensioned such that the crossmember 304 has a sliding fit with the eye-bolt 920. In this way, the handle 106-A' is movable in the lateral direction 316 such that the handle 106-A' is movable to a convenient location for use.

Figure 10:
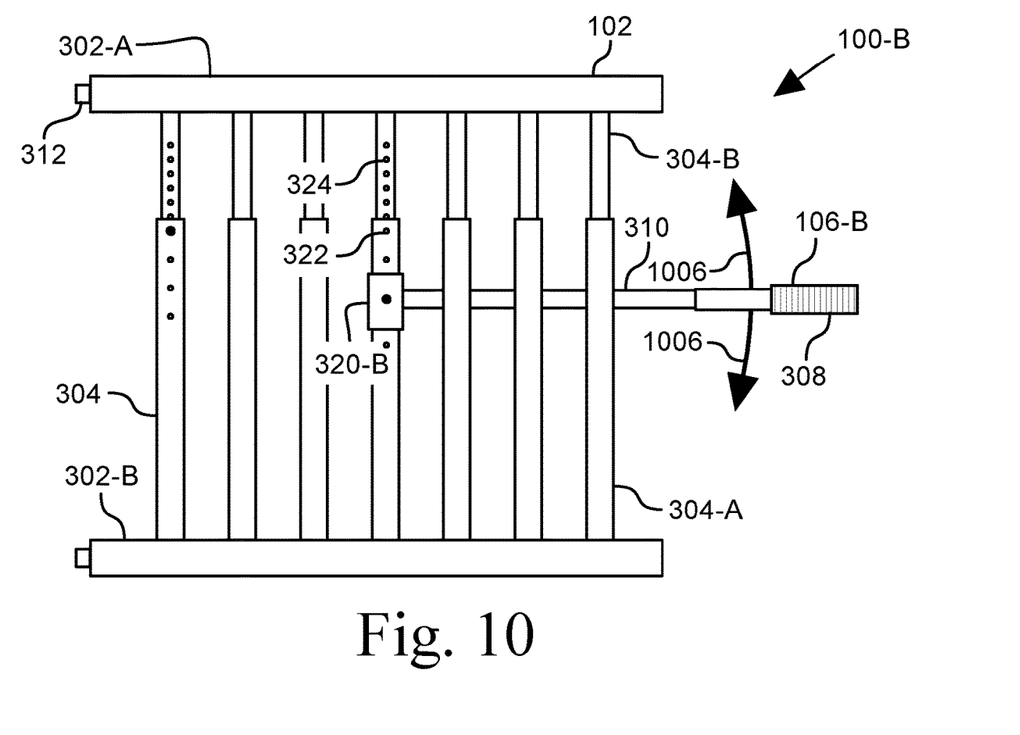
FIG. 10 is a top plan view of a second embodiment of a buggy.
Figure 11:
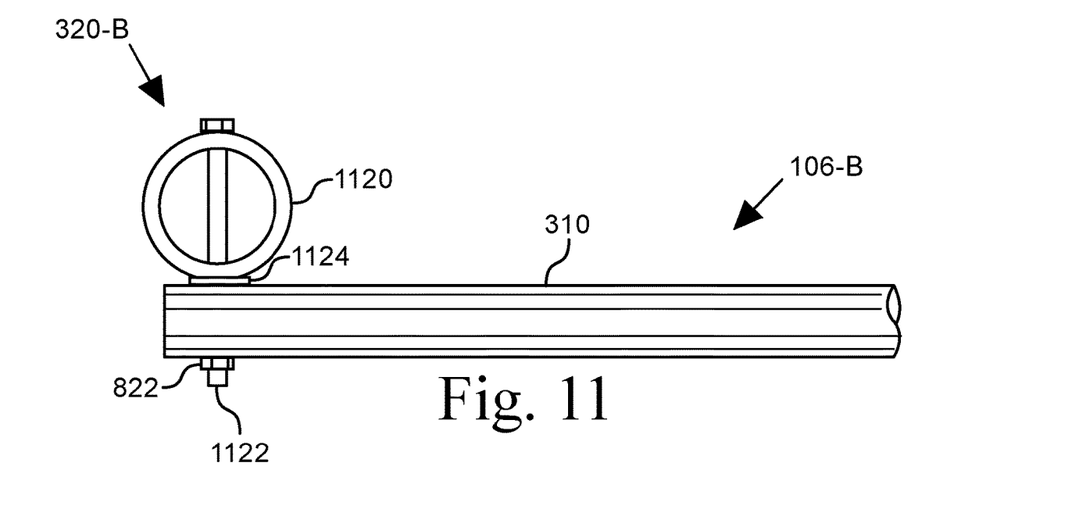
FIG. 11 is a partial side view of yet another embodiment of a handle.

FIG. 10 illustrates a top plan view of a second embodiment of a buggy 100-B. The illustrated embodiment includes a handle 106-B with a fitting 320-B that swivels. FIG. 11 illustrates a partial side view of yet another embodiment of a handle 106-B. The handle 106-B pivots or rotates in a direction 1006 centered around the pivot 1122. The pivoting handle 106-B enables the platform 102 to be manipulated either as illustrated or from the side when the handle 106-B is pivoted 90 degrees. The wheels 402 in such an embodiment are either casters or they are mounted at a 90 degree angle from the wheels 402 illustrated in FIGS. 4-7.

The fitting 320-B includes a sleeve 1120 and a pivot 1122 that secures the sleeve 1120 to the handle shaft 310. The sleeve 1120 is a tube that fits over a crossmember 304 with a sliding fit. The pivot 1122 in the illustrated embodiment is a bolt that passes through the sleeve 1120, through crossmember openings 322, 324, through a washer 1124, and through the handle shaft 310. The bolt 1122 is secured with a nut 822. The washer 1124 is a bearing that allows the handle shaft 310 to rotate about the pivot 1122 and the sleeve 1120. The crossmember 304 has a series of through-openings 322, 324 that allow the sleeve to be fixed to the crossmember 304. The through-openings 322, 324 also allow the width of the platform 102 to be fixed by securing the inner and outer members 304-A, 304-B together with the pivot 1122.

Figure 12:
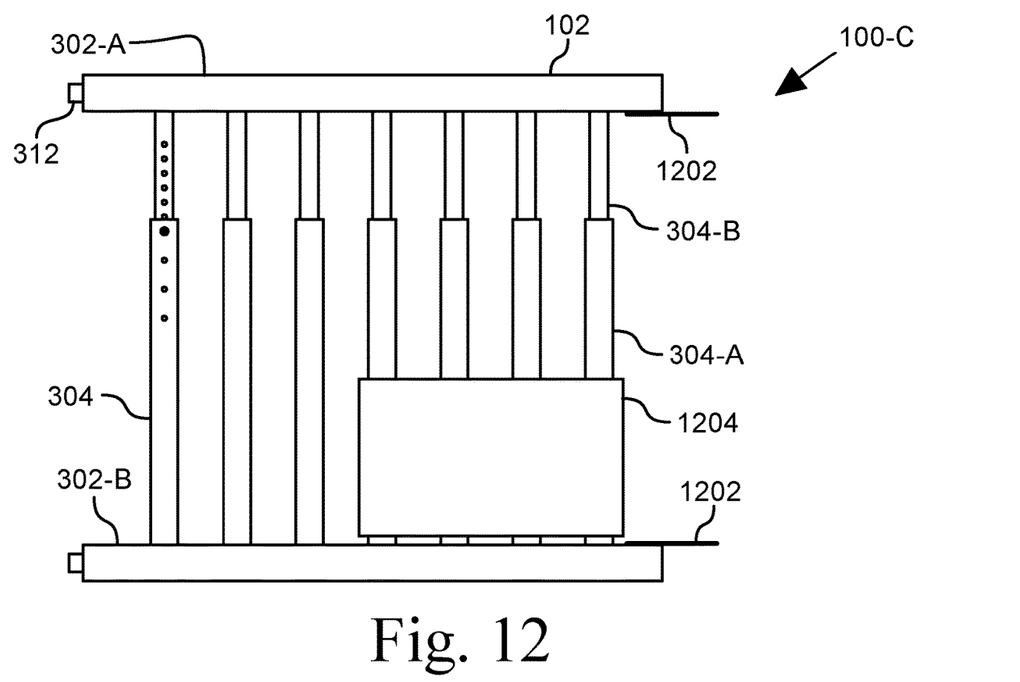
FIG. 12 is a top plan view of a third embodiment of a buggy showing tailgate hooks.

FIG. 12 illustrates a top plan view of a third embodiment of a buggy 100-C showing a pair of tailgate hooks 1202 and a shield or mini-platform 1204. The tailgate hooks 1202 allow for securing the platform 102 to the vehicle bed 114. In one such embodiment, the crossmember 304 serves as a handle or grip for moving the platform 102. In another embodiment, the buggy 100-C includes a handle 106 along with the tailgate hooks 1202.

The shield 1204 shown in FIG. 12 extends partially along the length of the crossmembers 304. In another embodiment, the shield 1204 extends between half or less of the crossmembers 304. In this way, multiple shields 1204 are able to be placed along the length of the platform 102.

In the illustrated embodiment, the shield 1204 has a width sufficient for two shields 1204 to fit side-by-side along the crossmembers 304 when those crossmembers 304 are adjusted to their minimum length, that is, when the pair of frame rails 302-A, 302-B are positioned at their closest position and the platform 102 is at its narrowest. In such an embodiment, the shield 1204 has a width sufficient for at least three shields 1204 to fit side-by-side along the crossmembers 304 when those crossmembers 304 are adjusted to their maximum length, that is, when the pair of frame rails 302-A, 302-B are positioned as far apart as possible and the platform 102 is at its widest. In this way the user has options available for placement of the shields 1204 for loading of the cargo 104. In another embodiment, the shield 1204 has a width sufficient to fit along the crossmembers 304 when those crossmembers 304 are adjusted to their minimum length.

Figure 13:
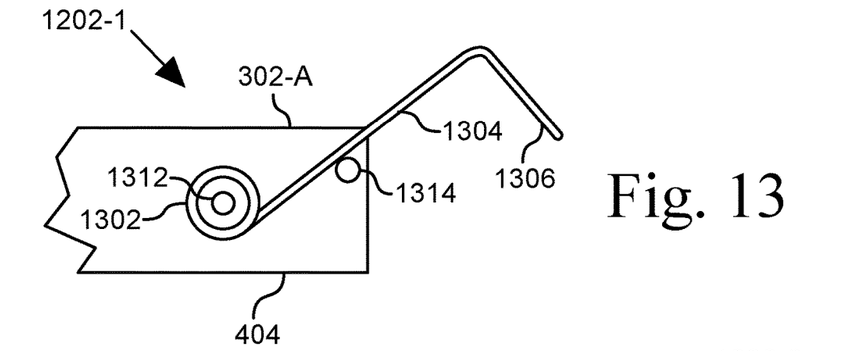
FIG. 13 is a side view of an embodiment of a tailgate hook in the raised position.
Figure 14:
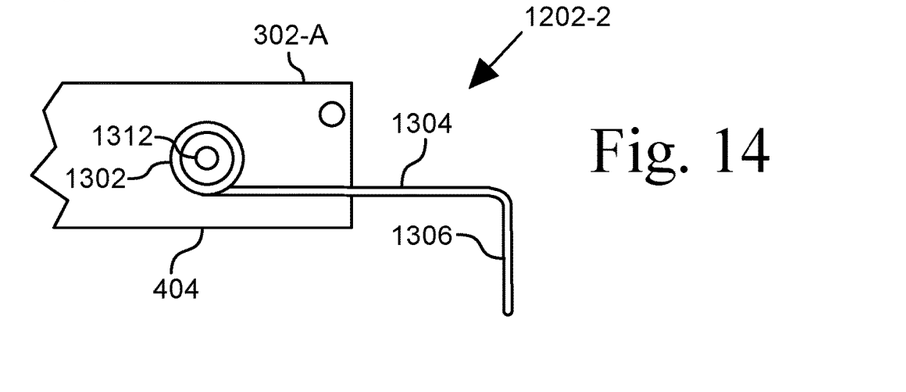
FIG. 14 is a side view of the embodiment of a tailgate hook in the lowered position.

FIG. 13 illustrates a side view of an embodiment of a tailgate hook 1202 in the raised position 1202-1. FIG. 14 illustrates a side view of the embodiment of a tailgate hook 1202 in the lowered position 1202-2. The hook 1202 includes a pivot 1312, a spring 1302, an arm 1304, and a catch 1306. The hook 1202 rotates about the pivot 1312 between the raised position 1202-1 and the lowered position 1202-2. In one embodiment, the spring 1302 biases the arm 1304 downward and the stop 1314 supports the arm 1304 in the raised position 1202-1. In another embodiment, the spring 1302 biases the arm 1304 upward and the stop 1314 is positioned to support the arm 1304 in the lowered position 1202-2.

The arm 1304 has a length sufficient to position the catch 1306 away from the end of frame rail 302-A. The catch 1306 has a length such that the catch 1306 engages the opening or gap between the vehicle bed floor 124 and the tailgate 116. In this way, with the catch 1306 in the gap, the buggy 100-B is secured in the bed 114.

Figure 15:
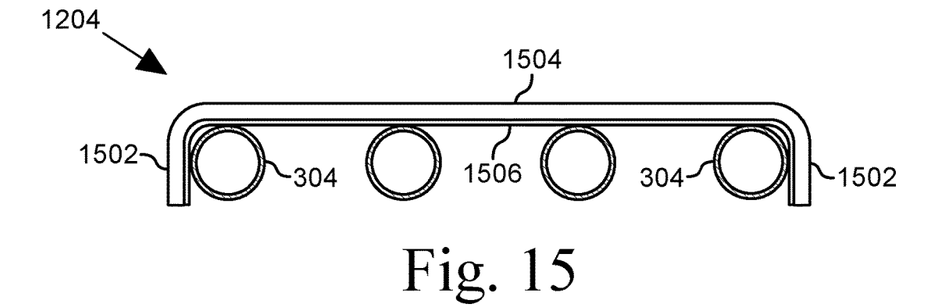
FIG. 15 is a side view of a shield.

FIG. 15 illustrates a side view of a shield 1204. The shield 1204 is a mini-platform that is supported by two or more crossmembers 304. The shield 1204 includes a planar member 1504 that supports cargo 104 that is too small to be adequately supported considering the spacing between the crossmembers 304. The shield 1204 prevents small cargo 104 from dropping, falling, or protruding through the space between adjacent crossmembers 304.

The shield 1204 includes the planar member 1504 at the top with opposing ends 1502 that are separated with a distance that allows the opposing ends 1502 to each engage a crossmember 304 such that the shield 1204 is held captive by the crossmembers 304. That is, the shield 1204 is constrained from moving in a direction that is parallel with the longitudinal axis of the frame rails 302. The planar member 1504 bridges the gap between adjacent crossmembers 304 and the planar member 1504 is sufficiently rigid to support the cargo 104 without the member 1504 sagging between the crossmembers 304.

In one embodiment, the shield or mini-platform 1204 is a solid material, such as a formed sheet. In another embodiment, the shield 1204 is a grate or perforated material, which prevents the cargo 104 from shifting or sliding on the surface 1504.

In the illustrated embodiment, the inside surface of the shield 1204 has a layer of material 1506 that contacts the crossmembers 304. In one embodiment, the layer of material 1506 is a resilient material, such as a polymer or a felt, that engages the crossmembers 304 so as to cushion the shield 1204 as it rests on the crossmembers 304, which avoids rattling of the shield 1204 against the crossmembers 304 and serves to restrain the shield 1204 from sliding along the crossmembers 304. In one such embodiment, the material 1506 is attached to the lower surface of the planar member 1504. In another such embodiment, the material 1506 is attached to the inside surface of the shield 1204 proximate the contact points of the crossmembers 304 to the shield 1204. For example, the material 1506 is attached in the corners defined by the planar member 1504 and the opposing ends 1502. In yet another embodiment, the planar member 1504 and the opposing ends 1502 of the shield 1204 are made of a material that is rigid enough to support cargo 104 without sagging between adjacent crossmembers 304 yet resilient enough to rest on the crossmembers 304 with some cushioning.

Figure 16:
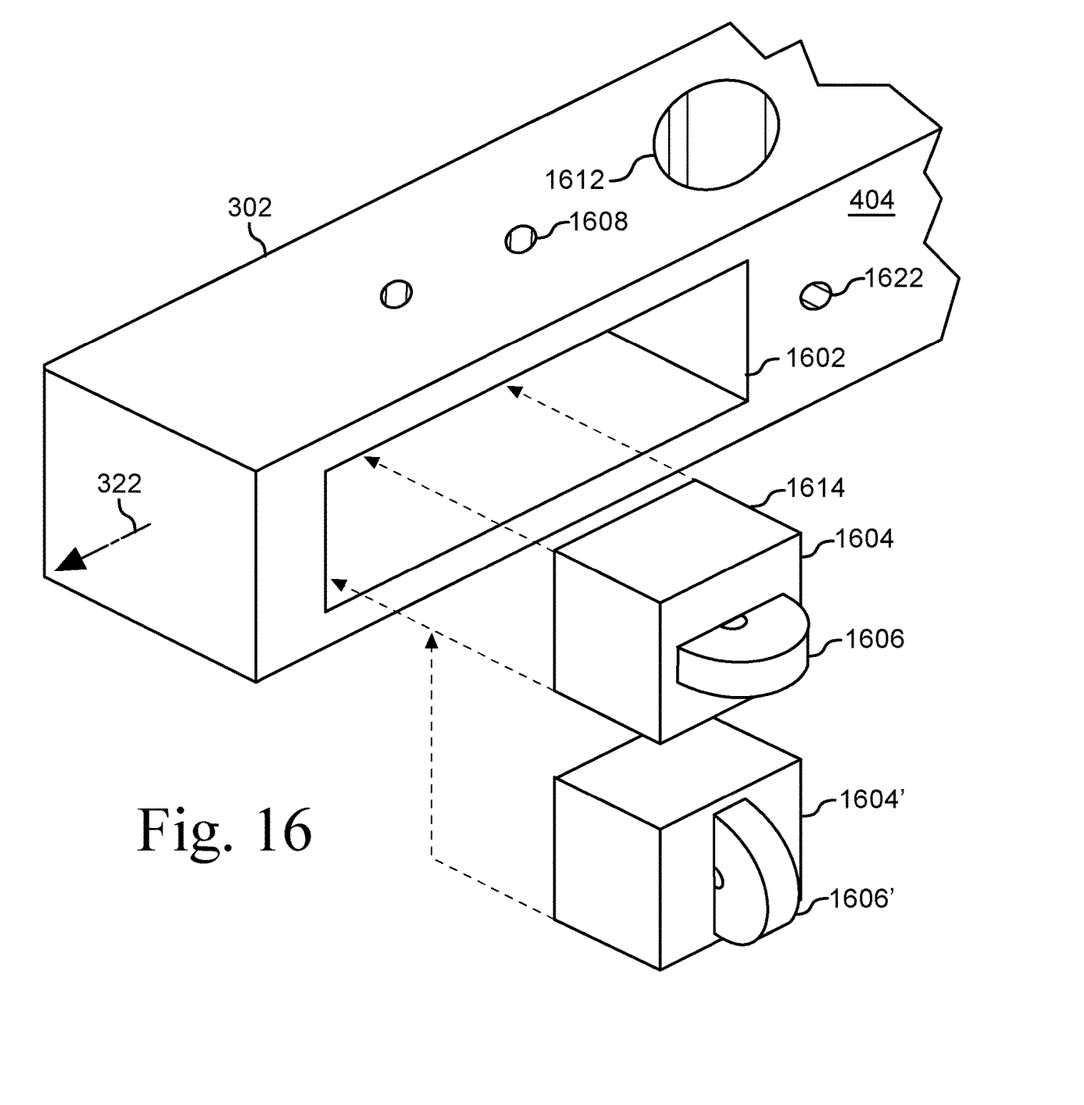
FIG. 16 is an oblique view of a partial frame rail with an integral wheel slide configuration.

FIG. 16 illustrates an oblique view of a partial frame rail 302 with an integral wheel slide configuration. The frame rail 302 has a cavity 1602 configured to receive a wheel assembly 1604. The wheel assembly 1604 has a block body 1614 with a portion of a wheel 1606 protruding from one end. FIG. 16 illustrates two wheel assemblies 1604, 1604'. One wheel assembly 1604 is oriented to be inserted in the cavity 1602 with the wheel 1606 oriented to roll on the bed floor 124 when the frame rail 302 is moved along the member's longitudinal axis 1612. With such an orientation, the buggy 100 moves as described for FIGS. 1-7.

The other illustrated wheel assembly 1604' is oriented to be inserted in the cavity 1602 with the wheel 1606 oriented to roll on the bed floor 124 when the frame rail 302 is moved perpendicular to the member's longitudinal axis 322. With such an orientation, the buggy 100 moves as described for one embodiment of the buggy 100-B illustrated in FIG. 10. The cavity 1602 has a length extending along the longitudinal axis 322 that is sufficient for the wheel assembly 1604' to be positioned such that the wheel 1606' engages the space 126 between the ridges 122 of the bed floor 124 when the buggy 100-B is positioned crossways in the bed 114, that is, the buggy 100-B is rotated 90 degrees horizontally to that shown in FIGS. 1-7. In this way, the cavity 1602 allows the wheel assembly 1604' to be positioned at different locations along the longitudinal axis of the frame rail 302 such that the wheel 1606' is positioned so that it rolls within the space 126 between ridges 122 of the bed floor 124. On the side of the crossmember 302 are openings 1608 into the cavity 1602. The openings 1608 receive a fastener that secures the block body 1614 in the cavity 1602 at the desired position.

Also illustrated in FIG. 16 is a blind opening 1612 on an inside face of the frame rail 302. A distal end of a crossmember 304 fits into the blind hole 1612. The platform 102 is readily assembled by securing the crossmembers 304 to the frame rails 302. The easy assembly of the platform 102 allows the unassembled platform 102 to be shipped in a small box or container.

In the illustrated embodiment, the bottom surface 404 of the frame rail 302 has an opening 1622 configured to receive a pin or fastener that secures the crossmember 304 in the hole 1612 to the frame rail 302. For example, a threaded screw or bolt inserted in the opening 1622 engages the crossmember 304 in the hole 1612, thereby securing the crossmember 304 to the rail 302. In another embodiment, the distal end of the crossmember 304 fits into the blind hole 1612 and is secured therein with an adhesive or other securing material or mechanism.

A method of using the buggy 100 includes the step of placing the buggy 100 in the bed 114. This step includes placing the buggy 100 in the bed 114 with the end of the platform 102 with the bumpers 312 positioned toward the front end 516 of the bed 114 and the distal end 318 of the handle 106 extending toward the tailgate 116 at the back of the bed 114. If necessary, this step includes lifting up on the hand grip 308 until the wheels 402 nearest the handle 106 are raised off the floor 124 of the bed 114. The platform is then wheeled into position using the handle 106. Because the handle 106 encounters the bottom of the crossmembers 304, the longitudinal axis 326 of the handle 106 remains substantially parallel with the longitudinal axis 322 of the frame rails 302, thereby positioning the hand grip 308 near the bed floor 124 at the start of the lifting step.

With the buggy 100 in the bed 114, another step is adjusting the width of the platform 102 such that the wheels 402 ride in ridges 122. In one embodiment, the platform 102 is adjusted by moving the pair of rails 302-A, 302-B either toward or away from each other. In this way the length of the crossmembers 304 is adjusted so that the wheels 402 have the desired width that fits in the ridges 122. In one embodiment, fasteners 326 lock the crossmembers 304-A, 304-B at a fixed, desired length. In another embodiment, the crossmembers 304-A, 304-B are not fixed in place, but the wheels 402 riding in the ridges 122 is sufficient to maintain the desired crossmember length.

With the buggy 100 placed in the vehicle bed 114, the step of moving the buggy 100 into the loading position 100-1 is performed. The loading position 100-1 is where the buggy 100 is positioned such that the cargo 104 is readily loadable on the platform 102 through an opening in the bed 114. Such an opening in the bed 114 includes the space above the bed 114 for a vehicle with an open bed and/or the end of the bed 114 that has an opening exposed when the tailgate 116 is in the open position, such as illustrated in FIG. 1.

In one embodiment, the step of moving includes moving the platform 102 toward the open tailgate 116 by grasping the handle 106 and moving the buggy 100 to a position toward the rear of the vehicle 112. When the platform 102 is at a convenient position, the cargo 104 is loaded on the platform 102 as desired. The buggy 100 is in the loading position or configuration 100-1 when located such that the cargo 104 is able to be loaded onto the top of the platform 102.

After the cargo 104 is loaded on the platform 102, the step of moving to the transport position 100-2 is performed. The transport position 100-2 is where the buggy 100 is positioned and secured in the vehicle bed 114. The transport position 100-2 is where the buggy 100 is restrained during transport, for example, when the vehicle 112 is in motion. In one embodiment, the buggy 100 is loosely restrained when in the transport position. For example, loosely restrained is when there is a gap of around one or two inches between the distal end 318 of the handle 106 and the tailgate 116 when the bumpers 312 are engaging the front end 516 of the bed 114. In another embodiment, the buggy 100 is snugly restrained in the bed 114. For example, snugly restrained is when the bumpers 312 engage the front end 516 and the distal end 318 of the handle 106 engages the closed tailgate 116.

The step of moving to the transport position 100-2 includes the step of moving the platform 102 toward the front end 516 of the bed 114. This step includes grasping or using the handle 106 and pushing the buggy 100 toward the front end 516 of the bed 114 until the bumpers 516 engage the front end 516. In another embodiment, this step includes using a crossmember 304 to push the platform 102 toward the front end 516 of the bed 114.

After the platform 102 is moved toward the front end 516, the next step is securing the platform in the transport position 100-2. In one embodiment, with the bumpers 312 engaging the front end 516, the securing step includes adjusting the length of the handle 106 such that the distal end 318 of the handle 106 is close to the inside surface of the tailgate 116 when the tailgate 116 is closed. In one embodiment, the length of the handle 106 is adjusted such that the buggy 100 is snugly restrained when the bumpers 312 engage the front end 516 and the distal end 318 of the handle 106 engages the closed tailgate 116. In such an embodiment, the length of the handle 106 is adjusted such that the ends of the buggy 100 are substantially in contact with both the front end 516 and the tailgate 116. In one such embodiment of snugly restrained, the bumpers 516 are resilient and the length of the handle 106 is adjusted such that the buggy 100 is biased against the front end 516 with the tailgate 116 closed.

In another embodiment, the length of the handle 106 is adjusted such that the buggy 100 is loosely restrained between the front end 516 and the tailgate 116. Loosely restrained is defined as the buggy 100 being able to move linearly between the front end 516 and the tailgate 116, but not with so much movement that the cargo 104 is subject to movement relative to the platform 102 with the vehicle 112 in motion. Generally, the less linear movement allowed the better. In one such embodiment, a loosely restrained buggy has less than six inches of linear movement. In other such embodiments, a loosely restrained buggy has no more than two inches of linear movement.

In another embodiment, the securing step includes moving the latching hook 1202 to lock the platform in a fixed position. In such an embodiment, the securing step includes moving the latching hook 1202 such that the catch 1306 at the distal end of the latching hook 1202 engages an opening between the vehicle bed floor 124 and the tailgate 116.

The steps to move the buggy 100 from the transport position 100-2 to the loading/unloading position 100-1 are the reverse of the steps to load the cargo 104 into the vehicle 112 with the buggy 100.

The buggy 100 includes various functions. The function of securing the buggy 100 in the transport position 100-2 is implemented, in one embodiment, by the handle 106 having an adjustable length. In another embodiment, the function of securing the buggy 100 is implemented with one or more hooks 1202, such as illustrated in FIGS. 12-14.

The function of fitting the platform 102 in the vehicle bed 114 is implemented, in one embodiment, by the platform 102 having an adjustable width. In one such embodiment, the width of the platform 102 is adjusted by way of the crossmembers 304, which have telescoping members 304-A, 304-B.

The function of lifting the platform 102 for maneuvering is implemented, in one embodiment, by the handle 106 being restrained from having the distal end 318 move above the plane defined by the crossmembers 304. That is, the handle 106 engages the bottoms of the crossmembers 304, thereby causing the platform 102 to tilt when the distal end 318 of the handle 106 is lifted higher after engaging the bottoms of the crossmembers 304.

The function of locking said platform 102 in a position in said vehicle bed 114 is implemented, in one embodiment, by the tailgate hook 1202 that has a lowered position 1202-2 where a catch 1306 is held captive in a gap in the vehicle bed 114.

The function of securing the buggy 100 in the transport position 100-1 is implemented, in one embodiment, by the bumpers 312 on one end of the platform 102 and the distal end 318 of the handle 106-A1 on an opposite end of the platform 102 such that the buggy 100-1 is wedged inside the vehicle bed 114.

The function of shipping in a container having a smaller size than the assembled buggy 100 is implemented, in one embodiment, by the rails 302 having a series of openings 1612 on opposing sides into which the ends of the crossmembers 304 fit. For shipping, the crossmembers 304 are removed from the openings 1612 in the rails 302. The deployed configuration has the crossmembers 304 secured in the openings 1612 in the rails 302.

The function of preventing cargo 104 from falling between adjacent crossmembers 304 is implemented, in one embodiment, by the shield 1204, which rests on top of at least two adjacent crossmembers 304 and has a pair of opposing sides 1502 that have crossmembers 304 proximate their inside surfaces.

From the foregoing description, it will be recognized by those skilled in the art that a buggy 100 configured to fit inside a vehicle has been provided. The buggy 100 includes a platform 102 and a handle 106. The platform 102, in one embodiment, is shipped disassembled in a small carton, with the platform 102 readily assembled by inserting each distal end of the crossmembers 304 into an opening 1612 in the frame rail 302.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for receiving and securing cargo in a vehicle bed wherein the vehicle bed has a floor with a plurality of ridges, the vehicle bed has a front wall and a tailgate, said apparatus comprising:
   a pair of frame rails, each one of said frame rails having a bottom, and each one of said pair of frame rails having a longitudinal axis;
   a plurality of crossmembers extending between said pair of frame rails, each one of said plurality of crossmembers having an adjustable length, said pair of frame rails and said plurality of crossmembers defining a platform having an adjustable width;
   a handle attached to one of said plurality of crossmembers, said handle extending below at least two of said plurality of crossmembers such that said handle is restrained from moving in a vertical direction by said at least two of said plurality of crossmembers, said handle having a handle length that is adjustable; and
   a plurality of wheels extending from said bottoms of said pair of frame rails;
   whereby said platform is movable between a loading position and a transport position, said transport position defined as a position where said apparatus is constrained against moving in a direction parallel to said longitudinal axes of said pair of frame rails.

2. The apparatus of claim 1 further including a pair of bumpers, each one of said pair of bumpers attached to a distal end of a corresponding one of said pair of frame rails.

3. The apparatus of claim 1 wherein said handle is attached to one of said plurality of crossmembers with a U-bolt proximate a distal end of said handle; and said one of said plurality of crossmembers held captive by said U-bolt.

4. The apparatus of claim 1 wherein said handle is attached to one of said plurality of crossmembers with a sleeve proximate a distal end of said handle; said sleeve slideably engaging said one of said plurality of crossmembers; and said sleeve attached to said distal end of said handle with a pivot.

5. The apparatus of claim 1 further including a hook, said hook including a pivot, an arm, and a catch, said hook positioned at an end of one of said pair of frame rails, said hook movable between a raised position and a deployed position, said deployed position being where a distal end of said catch extends below a plane defined by said plurality of wheels.

6. The apparatus of claim 1 further including a shield, said shield having a surface configured to engage at least two of said plurality of crossmembers, said shield having a pair of opposing ends extending downward from said surface, said shield having a deployed position where an inside portion of each one of said pair of opposing ends is proximate a corresponding one of said plurality of crossmembers such that said shield is constrained from moving in a direction parallel to a longitudinal axis of one of said pair of frame rails.

7. The apparatus of claim 1 wherein at least two of said plurality of wheels are casters.

8. The apparatus of claim 1 wherein said pair of frame rails includes a plurality of cavities extending into said pair of frame rails from said bottoms, each one of said plurality of wheels attached to a wheel assembly body, each one of said cavities sized to receive a corresponding one of said wheel assembly body.

9. The apparatus of claim 8 wherein said cavities have a length parallel to said longitudinal axes wherein said length is sufficient to allow said wheel assembly body to be positioned at a selected location along said length.

10. The apparatus of claim 1 wherein said pair of frame rails include a plurality of openings sized to receive a distal end of a corresponding one of said plurality of crossmembers, whereby said pair of frame rails and said plurality of crossmembers have a shipping configuration where said pair of frame rails and said plurality of crossmembers are unassembled, and said pair of frame rails and said plurality of crossmembers have a deployed configuration where said pair of frame rails and said plurality of crossmembers are assembled such that said plurality of crossmembers are secured to said pair of frame rails.

11. An apparatus for receiving and securing cargo in a vehicle bed wherein the vehicle bed has a floor with a plurality of ridges, the vehicle bed has a front wall and a tailgate, said apparatus comprising:
  a platform having a first rail and a second rail, said first rail parallel with said second rail, said platform including a plurality of crossmembers extending between said first and second rails, and each one of said plurality of crossmembers including a first section and a second section that telescopes relative to said first section such that said platform has an adjustable width;
  a set of wheels attached to said first and second rails of said platform; and
  a locking mechanism that secures said platform in a transport position, wherein said locking mechanism includes a handle attached to one of said plurality of crossmembers, said handle having a shaft with an adjustable length, and said handle restrained by at least one of said plurality of crossmembers from moving above a plane defined by said plurality of crossmembers.

12. The apparatus of claim 11 wherein said locking mechanism includes a hook, said hook including an arm and a catch, said hook positioned at an end of said first rail, said hook movable between a raised position and a deployed position, said deployed position being where a distal end of said catch extends below a plane defined by the bottom of said set of wheels.

13. The apparatus of claim 11 wherein said handle is attached to one of said plurality of crossmembers with a U-bolt proximate a distal end of said handle; and said one of said plurality of crossmembers held captive by said U-bolt.

14. The apparatus of claim 11 wherein said handle is attached to one of said plurality of crossmembers with a sleeve proximate a distal end of said handle; said sleeve slideably engaging said one of said plurality of crossmembers; and said sleeve attached to said distal end of said handle with a pivot.

15. The apparatus of claim 11 wherein set of wheels are adjustable relative to said first and second rails such that said set of wheels have a first position where said set of wheels move said first and second rails in a direction parallel to a longitudinal axis of said first rail, and said set of wheels have a second position where said set of wheels move said first and second rails in a direction perpendicular to said longitudinal axis of said first rail.

16. The apparatus of claim 11 further including a shield, said shield having a surface configured to rest on top of at least two of said plurality of crossmembers, said shield having a pair of opposing ends extending downward from said surface, said shield having a deployed position where an inside portion of each one of said pair of opposing ends is proximate a corresponding one of said plurality of crossmembers such that said shield is constrained from moving in a direction perpendicular to a longitudinal axis of one of said plurality of crossmembers.

17. A method of using a buggy having a platform and a handle, said method comprising the steps of:
  a) positioning said platform in a bed of a vehicle, said bed being a cargo-carrying area of said vehicle;
  b) adjusting the width of said platform such that a first plurality of wheels extending from a first frame rail of said platform rest in a first valley and a second plurality of wheels extending from a second frame rail of said platform rest in a second valley, said first and second valleys defined by corresponding adjacent ridges in a floor of said bed;
  c) moving said buggy into a loading position, said loading position defined as said platform being proximate an opening into said bed;
  d) loading a cargo onto said platform;
  e) moving said buggy into a transport position, said step of moving including the step of:
  e1) pushing said platform into said vehicle such that a distal end of said platform is proximate a front end of said bed; and
  f) securing said buggy in said transport position, said step of securing including the step of:
  f1) adjusting said handle such that said handle has a length where said buggy is restrained between said front end and said tailgate when said tailgate is in a closed position.

18. The method of claim 17 wherein step f) of securing said buggy further includes step f2) of ensuring said length is sufficient to loosely restrain said buggy between said front end and said tailgate, whereby loosely restrain is defined as said buggy being limited to less than 2 inches of linear movement between said front end and said tailgate.

19. The method of claim 17 wherein step f) of securing said buggy further includes step f2) of ensuring said length is sufficient to snugly restrain said buggy between said front end and said tailgate, whereby snugly restrain is defined as said buggy being substantially in contact with both said front end and said tailgate.

* * * * *